United States Patent
Staelin et al.

(10) Patent No.: US 7,346,208 B2
(45) Date of Patent: Mar. 18, 2008

(54) IMAGE ARTIFACT REDUCTION USING A NEURAL NETWORK

(75) Inventors: Carl Staelin, Haifa (IL); Mani Fischer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 10/692,582

(22) Filed: Oct. 25, 2003

(65) Prior Publication Data

US 2005/0089215 A1    Apr. 28, 2005

(51) Int. Cl.
G06K 9/62 (2006.01)
G06K 9/40 (2006.01)
G06E 1/00 (2006.01)

(52) U.S. Cl. .................. 382/157; 382/275; 706/15

(58) Field of Classification Search ............. 382/268
See application file for complete search history.

(56) References Cited

U.S. PATENT DOCUMENTS

| | | | | |
|---|---|---|---|---|
| 6,119,083 A * | 9/2000 | Hollier et al. | ............. | 704/243 |
| 7,092,573 B2 * | 8/2006 | Luo et al. | ................ | 382/228 |
| 2004/0260662 A1 * | 12/2004 | Staelin et al. | ............... | 706/16 |

OTHER PUBLICATIONS

Huang et al. "Adaptive MLP post-processing for block-based coded images"; Y.-L. Huang and R.-F. Chang; IEE Proc.-Vis. Image Signal Process, vol. 147, No. 5, Oct. 2000.*
Kwon et al. "Blocking Artifacts Reduction Algorithm in Block Boundary Area Using Neural Network"; Kee-Koo Kwon, Suk-Hwan Lee, Jong-Won Lee, Seong-Won Ban, Kyung-Nam Park, and Kuhn-Il Lee; Industrial Electronics, 2001. Proceedings. ISIE 2001. IEEE International Symposium on; 2001.*
Staelin et al. "Neural Network Image Scaling Using Spatial Errors", Carl Staelin, Darryl Greig, Mani Fischer, and Ron Maurer; Oct. 30, 2003.*
Qiu G: "MLP for Adaptive Postprocessing Block-Coded Images" IEEE Transactions on Circuits and Systems for video Tech. IEEE Inc. NY US vol. 10, No. 8 Dec. 2002, pp. 1450-14654.
Qiu G et al.: "Post-Processing Block Coded Images using Artificial Neural Networks" Processing and ITS App. (Conf. Publ. No. 443) IEEE London, UK, vol. 2, Jul. 15, 1997, pp. 684.
Kee-Koo Kwon et al: "Blocking artificats reduction algorithm in block boundary using neural network". 2001 IEEE International Symposium on Industrial Electronics Proceedings.

* cited by examiner

Primary Examiner—Jingge Wu
Assistant Examiner—Charles Kim

(57) ABSTRACT

A neural network is trained and used to reduce artifacts in spatial domain representations of images that were compressed by a transform method and then decompressed. For example, the neural network can be trained and used to reduce artifacts such as blocking and ringing artifacts in JPEG images.

25 Claims, 7 Drawing Sheets

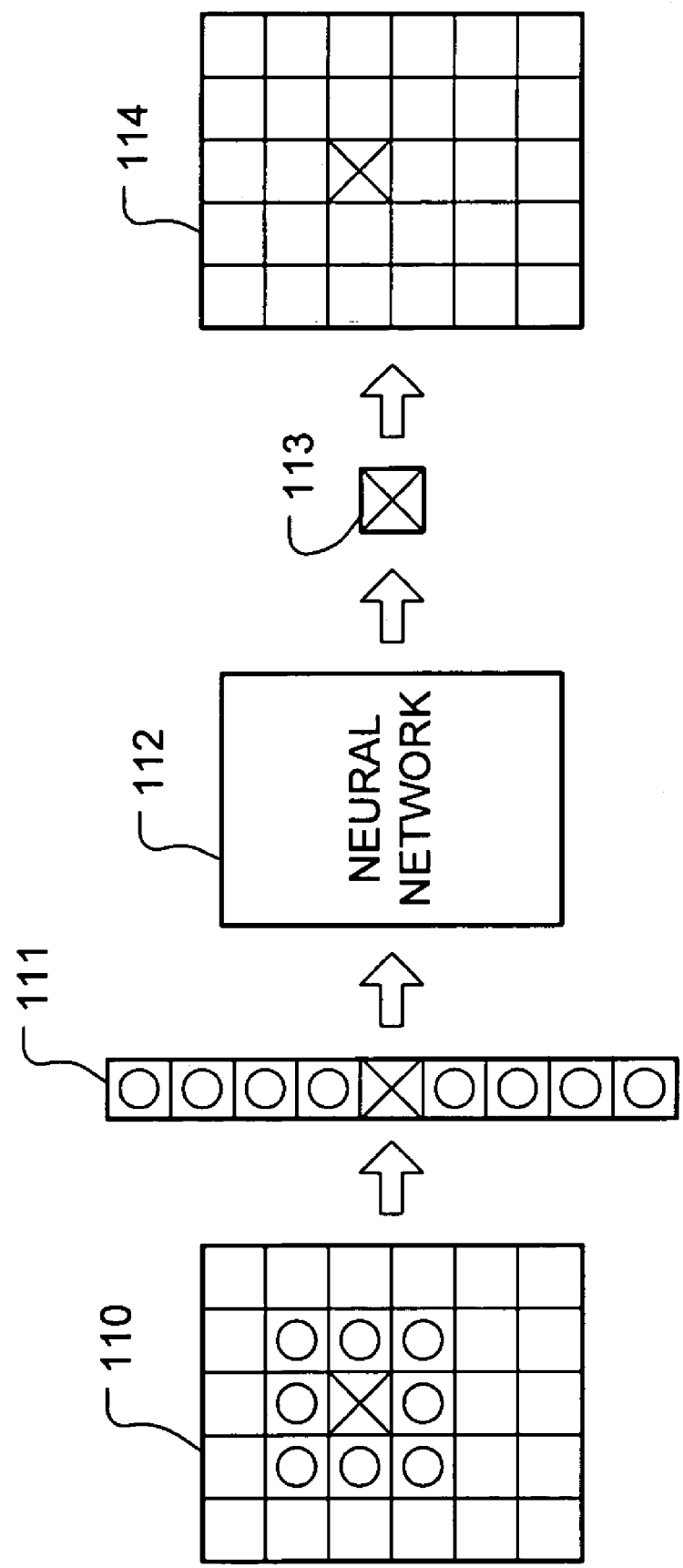

IMAGE ARTIFACT REDUCTION USING A NEURAL NETWORK

BACKGROUND

Data compression is often used for reducing the cost of storing large data files on computers as well as reducing the time to transmit large data files between computers. In the so-called "transform methods" data is transformed into coefficients that represent the data in a frequency domain. Coefficients may be quantized (lossy compression), and redundancy in the quantized coefficients may then be reduced or eliminated (lossless compression).

JPEG is a standardized image compression algorithm. JPEG compression of an image includes dividing the image into a grid of non-overlapping 8×8 blocks of pixels, and independently coding each pixel block. The coding of each pixel block includes taking a two-dimensional Discrete Cosine Transform (DCT) to obtain an 8×8 block of DCT coefficients; and quantizing the DCT coefficients. The quantization exploits the following: the low frequency DCT coefficients contain most of the image energy; sensitivity limits of the human visual system vary with spatial frequency (e.g., small high frequency changes are perceived less accurately than small low frequency changes); and the human visual system is much more sensitive to high frequency variations in luminance than similar variations in color.

The image may be reconstructed by performing an inverse DCT transform on the quantized coefficients. Because the coefficients are quantized, the reconstructed image does not contain all of the information of the original image (that is, the image prior to compression). Consequently, the reconstructed image is not identical to the original image.

Moreover, the reconstructed image can contain artifacts that were not present in the original image. For example, compare FIGS. 2a and 2b, which are images of a sliced fruit against a textured background. FIG. 2a shows the sliced fruit and textured background prior to JPEG compression. Notice the gradual change in color of the textured background, and the crisp edges between the sliced fruit and the background.

FIG. 2b shows the sliced fruit and textured background after the image was JPEG-compressed and thereafter decompressed. Now notice the background texture of the decompressed image. Instead of texture, there appear groups of blocks of different shades (each 8×8 DCT block is smoothed to a single shade). These artifacts are referred to as "blocking" artifacts. In addition, the edges of the sliced fruit are no longer crisp. Echoes or shadows appear at the edges. These artifacts at the edges are referred to as "ringing" artifacts.

The blocking and ringing artifacts can degrade image quality. They are especially prominent if the JPEG-compression was performed at a low bit rate (i.e., a highly compressed image).

It is desirable to reduce the artifacts in decompressed images.

SUMMARY

According to one aspect of the present invention, a neural network is trained and used to reduce artifacts in spatial domain representations of images that were compressed by a transform method and then decompressed. For example, the neural network can be trained and used to reduce artifacts such as blocking and ringing artifacts in JPEG images.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is an illustration of a method of performing artifact reduction in accordance with an embodiment of the present invention.

DETAILED DESCRIPTION

Figure 2A:
FIGS. 2a-2c are images of the same scene.

As shown in the drawings for purposes of illustration, the present invention is embodied in methods of training and using a neural network to reduce artifacts in a JPEG image. The JPEG image refers to a digital image (the "original" image) that was compressed in accordance with the JPEG standard and then decompressed. Thus the JPEG image is represented in the spatial domain. Although the present invention is described in connection with JPEG, it is not so limited. The present invention may be used in connection other transform methods that utilize lossy compression.

In the following paragraphs, the training and use of the neural network will be described in connection with a grayscale JPEG image. Later on, training and use of full color JPEG images will be addressed.

Reference is made to FIG. 1. A grayscale JPEG image 110 is inputted to a neural network 112, which has already been trained to perform artifact reduction. For each pixel being processed, an input vector 111 is formed. The input vector 111 may include the pixel being processed (indicated by the "X"), and a plurality of pixels (indicated by circles) in a neighborhood of the pixel being processed. For example, each input vector 111 could be formed from a 3×3 window containing the pixel being processed and eight neighboring pixels (as shown in FIG. 1), or each input vector 111 could be formed from a 5×5 window containing the pixel being processed and twenty four neighboring pixels. Prior to processing, the input vector 111 may be scaled by subtracting the value of the pixel being processed from the value of each pixel in the input vector 111. If this is done, the scaled input vector 111 need not include the pixel being processed, which would have a value of zero.

The neural network 112 processes the input vectors 111 independently of one another. Each input vector 111 is processed to produce a single pixel 113 in an output image 114. This output pixel 113 has the same spatial position as the pixel being processed. Thus each pixel value in the output image 114 is predicted from a contextual window of the JPEG image 110. If artifacts such as blocking and ringing appear in the JPEG image 110, those artifacts are generally reduced in the output image 114.

The input vectors 111 may be processed serially by a single processor system. However, since the input vectors are processed independently of one another, a multi-processor system can processes a plurality of input vectors 111 in parallel.

Figure 2B:
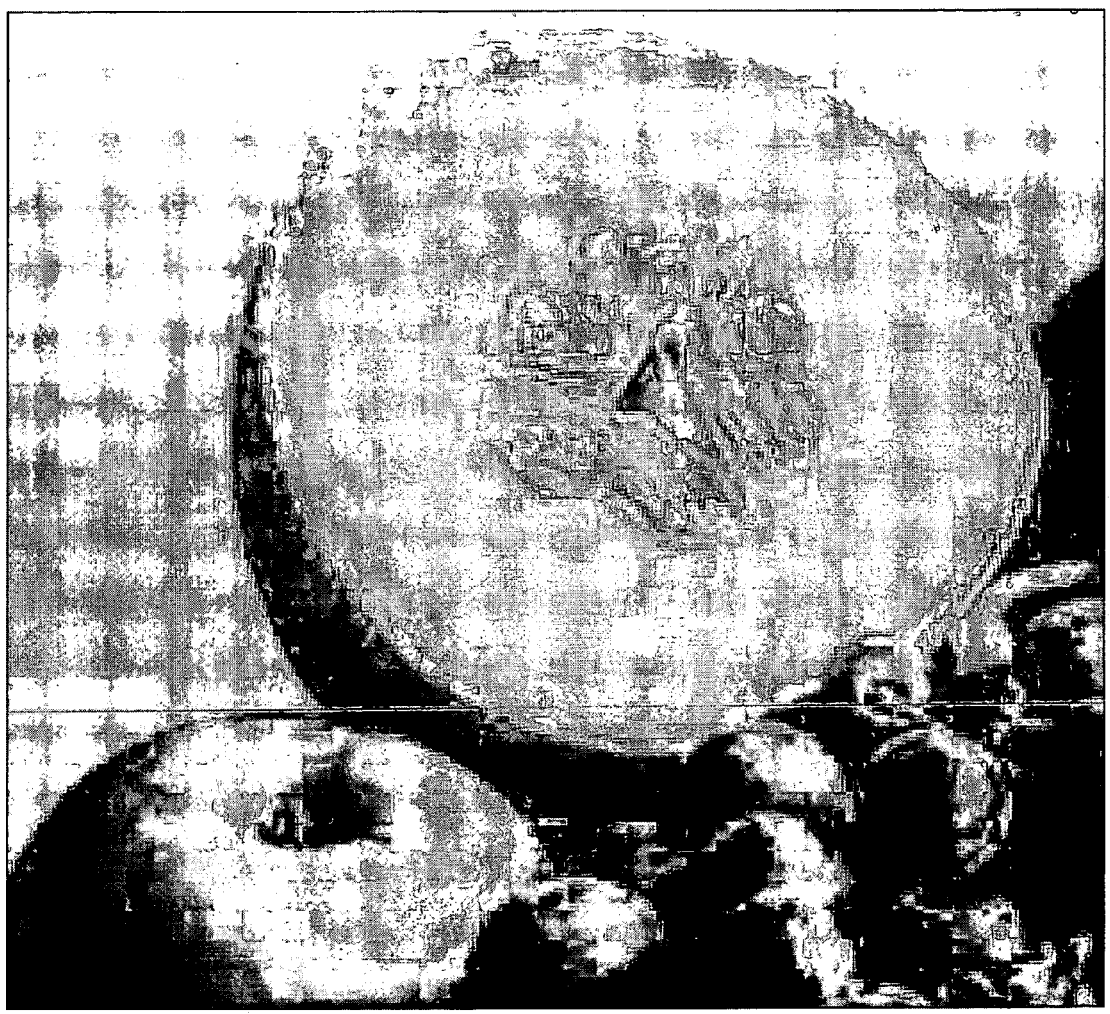
Figure 2C:
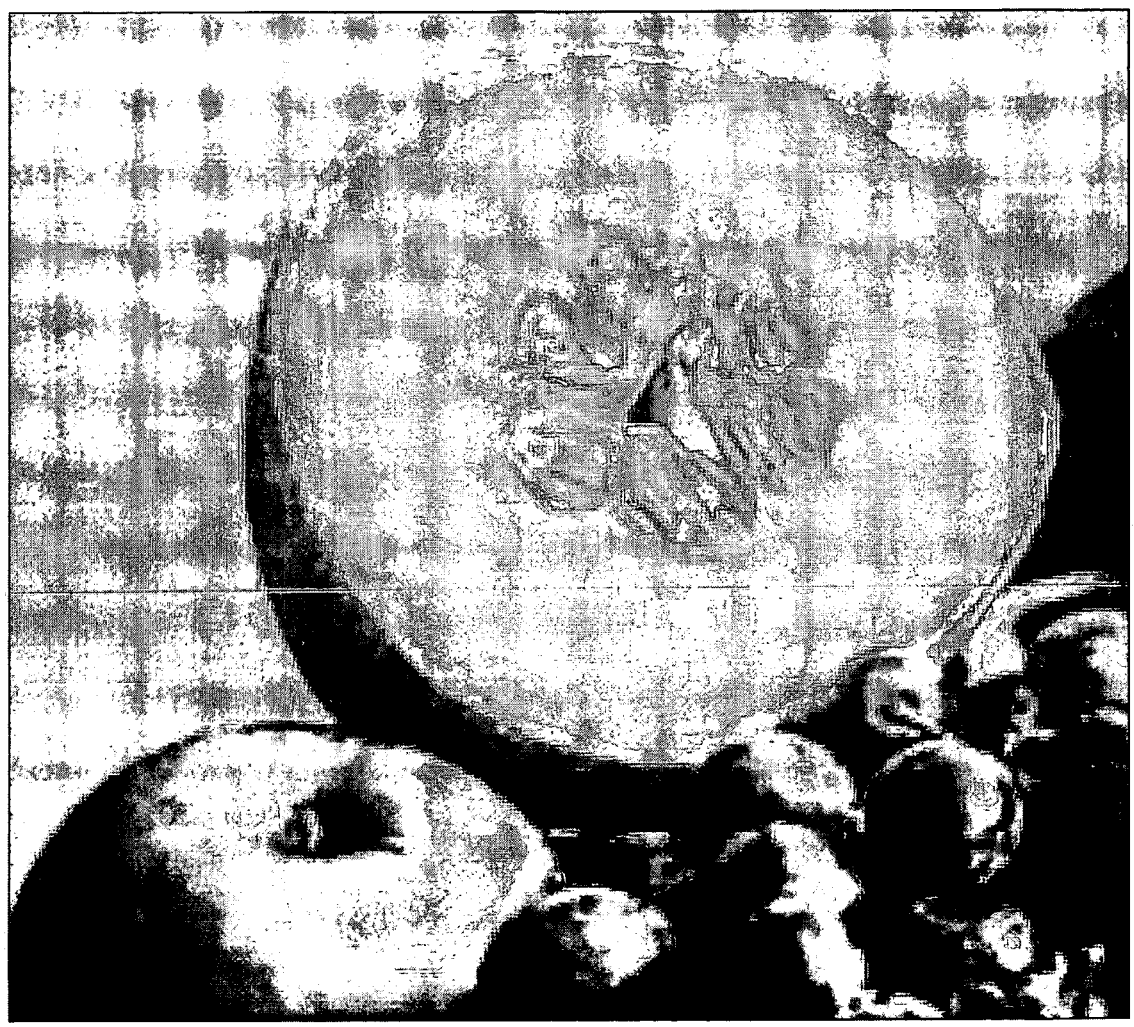

Reference is now made to FIGS. 2a-2c. As discussed above, FIG. 2a shows the original image of a scene including sliced fruit against a textured background, and FIG. 2b shows the same scene after the image has been JPEG-compressed and thereafter decompressed. The decompressed image contains blocking artifacts in the background and ringing artifacts at edges of the sliced fruit.

FIG. 2c shows the output image produced by the trained neural network 112 (this is an actual image produced by a neural network that was reduced to practice). The neural network 112 does not eliminate the artifacts, but it does reduce the artifacts. The output image still contains blocking artifacts, but those artifacts are smoothed. Notice the background, which still contains blocks of different shades. The output image still contains, ringing artifacts, but the ringing artifacts are not as noticeable.

Training of the neural network 112 will now be described. The neural network 112 is defined by its nodes, connections, and connection weights. A weight vector is the vector of connection weights between each pair of connected nodes in the neural network 112. Training involves optimizing these weights so as to reduce the error between the output image 114 and the original image 110.

Figure 3:
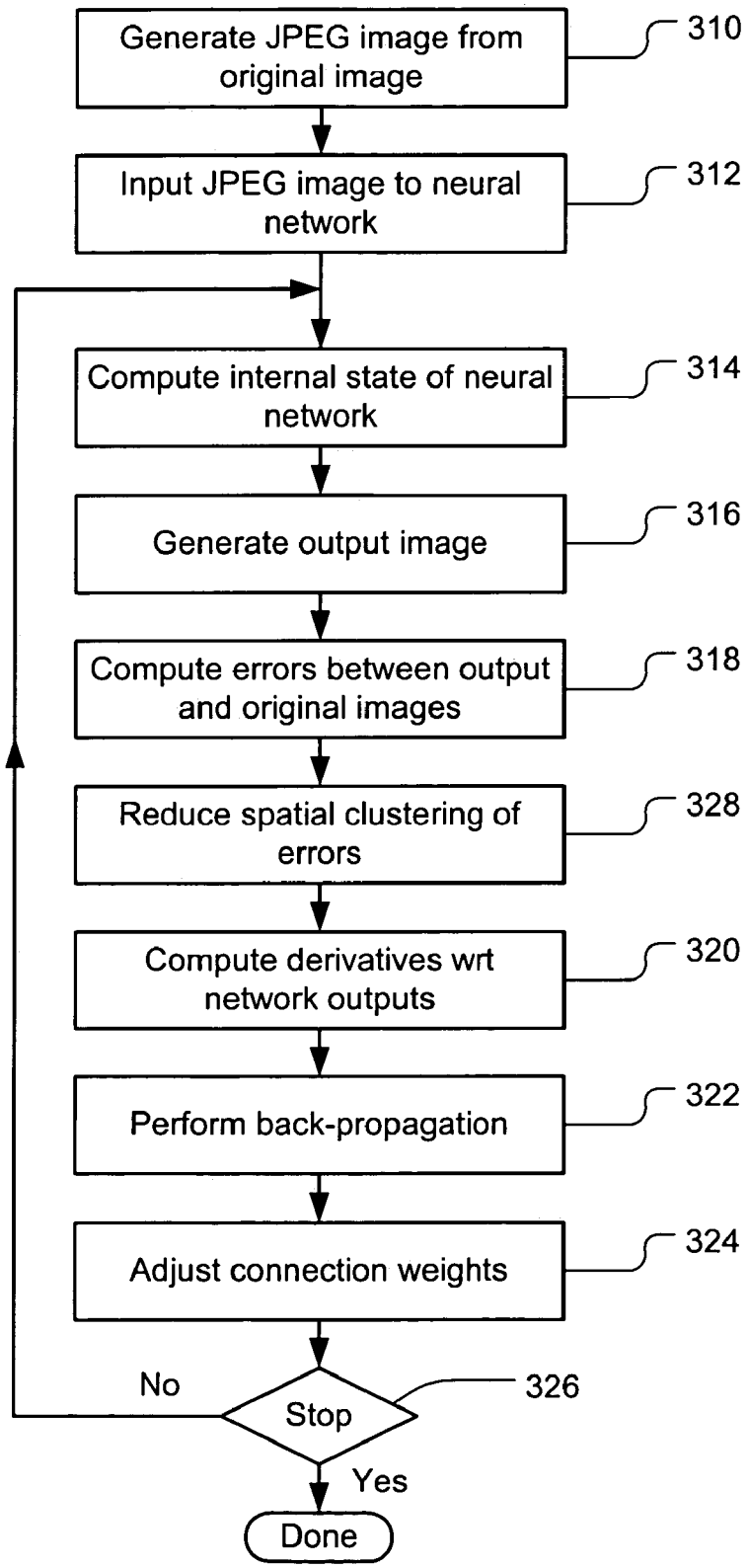
FIG. 3 is an illustration of a method of training a neural network to perform artifact reduction in accordance with an embodiment of the present invention.

Reference is now made to FIG. 3, which illustrates a method of training the neural network 112. A JPEG image is generated by compressing an original image according to the JPEG standard and then decompressing the compressed image (310). The JPEG image and the original image form a training pair.

The JPEG image is inputted to the neural network (312). An input vector is formed for each pixel, and each input vector is inputted to the neural network 112.

The neural network forward-propagates each of the input vectors to compute values of the nodes (314). The connection weights are used to compute these node values. During forward propagation, values from the hidden and output nodes may be obtained by computing the network-weighted sum in a progressive manner. For example, the input to a first hidden node is the weighted sum of the inputs from the given input pattern. The weights used for the weighted sum are the current values of the connections between the inputs and the first hidden unit. The output of the first hidden node is a non-linear activation function (e.g., a hyperbolic tangent) of the input. Once this is computed, the input to the second hidden unit is computed as the appropriate weighted sum of the inputs and the output of the first hidden node, and so forth. The output values from the output nodes represent the current network prediction for the output image (316).

Errors between pixels of the output image and corresponding pixels of the original image are determined (318). For example, an error image may be formed by subtracting the output image from the original image.

Derivatives of the errors are computed with respect to the output image (320). The derivatives may be computed in a conventional manner, for example by using sum-squared errors (SSE). In the alternative, the derivatives may be computed from spatial errors as disclosed in assignee's U.S. Ser. No. 10/600,671 filed Jun. 20, 2003, which is incorporated herein by reference. Using spatial errors, the derivative for a predicted pixel in the output image is a function of differences between predicted values in a spatial neighborhood of the output image and the corresponding values in the original image.

If a spatial error measure is used, the spatial error measure may also involve reducing the clustering of undesirable spatial patters of errors (328). This step is described in U.S. Ser. No. 10/600,671.

Once the derivatives for the pixels in the output image have been generated, back-propagation is performed to compute error gradients (322). The error gradients may be computed as derivatives of the network output with respect to the network weights. The back-propagation may be performed in a conventional manner. For example, using the chain rule of differentiation, the derivative of the network error may be expressed with respect to the network weights as a product of the derivatives of the network error with respect to the network output and the derivatives of the network output with respect to the network weights.

The error gradients are used to adjust the node weights to reduce the network errors (324). This may be done in a conventional manner. The error gradients may be used iteratively to find weights that result in a lower error. For example, a gradient descent optimization algorithm such as BFGS or a simpler gradient descent algorithm may be used.

Second and subsequent iterations may then be performed until a stopping criteria is reached (326). For each iteration (314-324), an output image is generated from the JPEG image and the adjusted weights, errors are computed, derivatives are computed from the errors, back-propagation is performed, and node weights are further adjusted.

The stopping criteria may be one of the following, or a combination of the following (the following stopping criteria is exemplary, not exhaustive):

(1) The neural network error derivative is within a threshold.
(2) The neural network error is within a threshold.
(3) The neural network has completed a maximum number of training iterations.
(4) The neural network has achieved a spatial error minimum when evaluated on an independent validation set.

The neural network is not limited to any particular architecture. A general feedforward architecture, a single-layer or multi-layer network, or another architecture may be used.

An exemplary feed-forward neural network architecture may have linear output nodes and tanh activation in the hidden nodes. Each input node is connected to each hidden and output node, and the connection weight between the $i^{th}$ and $j^{th}$ nodes is represented as $w_{i,j}$. The hidden nodes are ordered, and each hidden node is connected to each subsequent hidden node and to each output node. The first input is a bias input with a constant value of one. Each network node has an index, with index 0 being the bias input, indices 1 to $N_{in}$ corresponding to the input nodes, indices $N_{in}+1$ to $N_{in}+N_{hid}$ corresponding to the hidden nodes, and indices $N_{in}+N_{hid}+1$ to $N_{in}+N_{out}$ corresponding to the output nodes.

The output function for the $i^{th}$ node (input, output or hidden) may be represented in terms of previous hidden and input nodes as follows:

$$a_i = \tanh\left(\sum_{j=0}^{i-1} w_{i,j} x_j\right)$$

where $a_i$ represents the $i^{th}$ output node. Since the output nodes are linear, the output of the $i^{th}$ node may be represented in terms of previous output, hidden and input nodes as follows.

$$a_i = \sum_{j=0}^{i-1} w_{i,j} x_j$$

Figure 4:
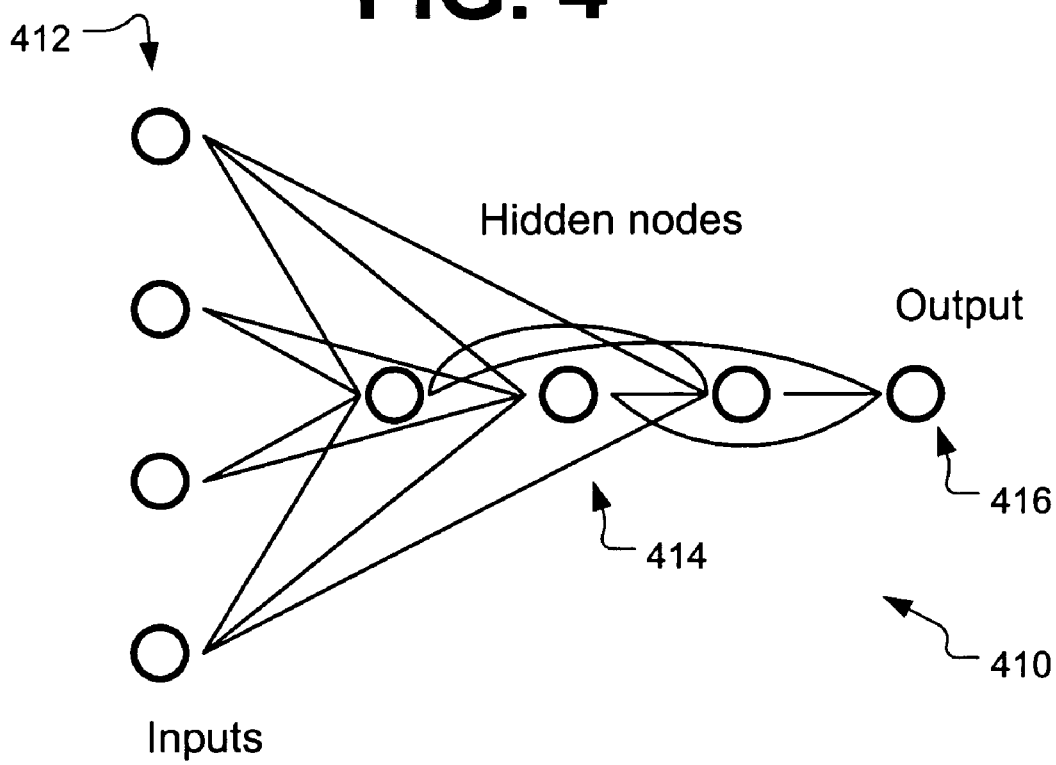
FIG. 4 is an illustration of an exemplary neural network architecture.

A generalized feedforward network of any given size can mimic any layered architecture with an equivalent number of total hidden nodes. For example, the feedforward neural network 410 illustrated in FIG. 4 has three inputs 412, three hidden nodes 414, and a single output node 416. In practice very few hidden nodes 414 are needed to provide satisfactory results. In particular, neural networks with as few as ten hidden nodes 414 can yield satisfactory results.

Input and output values of the neural network may be coded to improve the neural network accuracy. The coding may be performed to fit the input and output values within a range (e.g., [−1,1]). This is done to better suit the dynamic range of the activation functions, and also to minimize the dimensionality of the input/target space. Exemplary coding schemes include simple coding, relative coding, and scaled coding.

In simple coding, each input value is scaled to the range [0, . . . , 1] by dividing by 255 (for eight-bit values). This transformation ensures that the network inputs and outputs always fall between 0 and 1. Each output value is converted back to a value within the range [0, . . . , 255] by multiplying by 255.

In relative coding, simple coding is performed on each input vector, and the value of the pixel being processed is subtracted from all values in the input vector. The scaled input vector need not include the pixel being processed, since its value was reduced to zero. Inputs and outputs are in the range [−1, . . . , 1]. Each output value is then converted back to a value within the range [0, . . . , 255] by CLIP (network_output.255+dc), where dc is the input value of the pixel being processed (i.e., the central pixel in the input window), and the operation CLIP(x) returns a 0 if x<0, 255 if x>255, and x otherwise.

The relative coding makes it easier for the neural network to recognize edges and features. This has the effect of adjusting the DC level and making edges the same, regardless of their grey level.

In scaled coding the relative coding is computed. Then the inputs and outputs are scaled by a dynamic range of the inputs, so the inputs are usually "stretched" to [−1, . . . , 1]. The output is not bounded. Thus the dynamic range of the output pixels may be larger than the dynamic range of the input pixels. Unlike relative coding, scaled coding produces edges that have similar dynamic ranges. As a benefit, the neural network only learns about the shape of edges, and not edge height. For example, in relative coding, an edge with a difference of 70 gray levels would look significantly different than the same edge with a difference of 150 gray levels. Using scaled coding, the neural network can recognize the edge without concern about the height. The scaling factor can be clipped to help prevent noise appear as structure to the neural network, while transforming edges so they appear similar to the neural network.

The following table demonstrates the range differences between these coding types.

| Type | Inputs | Outputs |
|---|---|---|
| Simple | [0, . . . , 1] | [0, . . . , 1] |
| Relative | [−1, . . . , 1] | [−1, . . . , 1] |
| Scaled | [−1, . . . , 1] | unlimited |

The training described above is performed with a single JPEG image and its corresponding original image. However, the training is not so limited to a single pair of images. The neural network can be trained on multiple (e.g., twenty five) pairs of images. The image pairs in the training set may include a reasonable collection of good and hopefully representative images with various "types" of images, such as people, landscapes, man-made objects, still life, text, etc. The JPEG images might have been compressed at different quality factors (e.g., one each for quality factors of 20, 40, 60, 80 and 90).

The neural network may be fully trained on one image in the pair, before being supplied with the next image in the set. In the alternative, the training may be performed over multiple runs. For example, a first training run involves only a small set of training images and results in the neural network being near the desired point. A second training run based on a larger number of input images is then performed until the neural network satisfies a stopping criteria.

More than one pixel could be processed at a time. For example, the neural network could process pixels in 3×3 blocks when given a 7×7 input block.

The neural network could be trained using an optimization function (e.g., using a non-gradient based training algorithm such as simulated annealing or genetic algorithms) that does not require or utilize error gradients or derivatives. Such training would be based on the error function.

Figure 5:
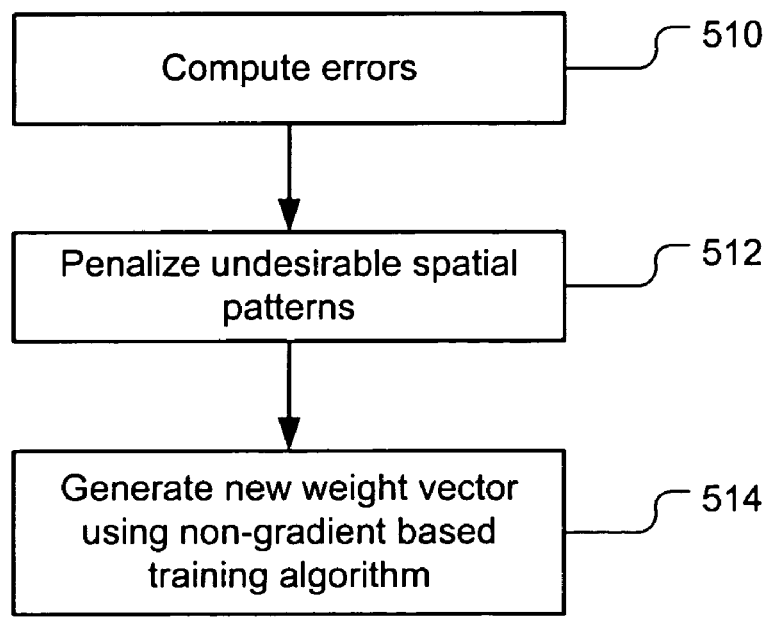
FIG. 5 is an illustration of a method of training a neural network in accordance with another embodiment of the present invention.

Reference is made to FIG. 5. Non-gradient based training may include the following steps. Pixel errors between a JPEG image and an original image are determined (510). Undesirable spatial patterns of errors may be penalized (512), as described in U.S. Ser. No. 10/600,671. Errors are reduced by generating a new weight vector using the non-gradient based training algorithm such as a non-gradient descent algorithm (514).

The neural network can be trained to recognize inputs in addition to the JPEG image. For example, the input vectors may include x- and y-offsets. These offsets indicate the distance (in pixels, for example) of the pixel being processed from a block boundary (that is the boundary of a DCT block). Many JPEG artifacts are more apparent and common near block boundaries. For example, in relatively flat regions, the blocking artifacts are caused by abrupt transitions in the DC value at block boundaries. If the network knows that a pixel is at a block boundary, then it is more likely to guess that such an edge/transition is likely to be an artifact that should be smoothed, rather than a true edge, which should be preserved.

The input vectors are not limited to 5×5 neighborhoods. A larger neighborhood results in a greater dependency on neighbors. Larger neighborhoods take longer to process, but offer more information and thereby allow the neural network to make better decisions.

The neural network is not limited to operating on grayscale images. The neural network can be applied to color images in several ways, including but not limited to the following. As a first example, the color image is converted from non-perceptual color space (e.g., RGB) to a perceptual color space such as YCC or LAB, and only the luminance information is modified by the neural network. The color channels are not processed for artifact reduction. The modified luminance and unmodified color channels are converted back to the non-perceptual color space.

In the next three examples, artifacts are removed from the color channels. In JPEG, the color channels tend to be compressed much more than the luminance channel, mainly because the human visual system is not as sensitive to color shifts. However, blocked colors can be visually disturbing, so modifying the color channels with the neural network to smooth block edges can be beneficial.

As a second example of processing a color image, the input image is given in non-perceptual color space such as RGB. Neural networks are applied separately to each channel. Outputs of the neural networks provide color components of the output image.

As a third example of processing a color image, the input image is given in non-perceptual color space. The input image is converted to perceptual color space, each channel is modified by a neural network, and the modified channels are converted back to non-perceptual color space.

As a fourth example, the input image is given as an RGB representation. A luminance channel is extracted from the input image and modified by the neural network. A modified color image is produced by adding a delta to each channel of each pixel in the non-perceptual color image. Each delta is computed as the difference between the corresponding luminance value in the modified luminance channel and the corresponding luminance value in the original luminance channel.

If any of the values of the modified image is outside of the RGB gamut, a gamut-clipping operation may be applied. Each RGB value may be clipped separately to the allowed range, or a more sophisticated gamut-mapping method may be used to preserve perceptual attributes such as hue. One such gamut-mapping method is disclosed in U.S. Ser. No. 10/377,911 entitled "System and method of gamut mapping image data" and filed on Feb. 28, 2003. In this fifth example, a color image is modified without computing chrominance channels explicitly.

There is no preferred hardware implementation for the method of training the neural networks according to the present invention, and there is no preferred hardware implementation for the trained neural networks. An exemplary hardware implementation for both the training of neural networks and a trained neural network is illustrated in FIG. 6.

Figure 6:
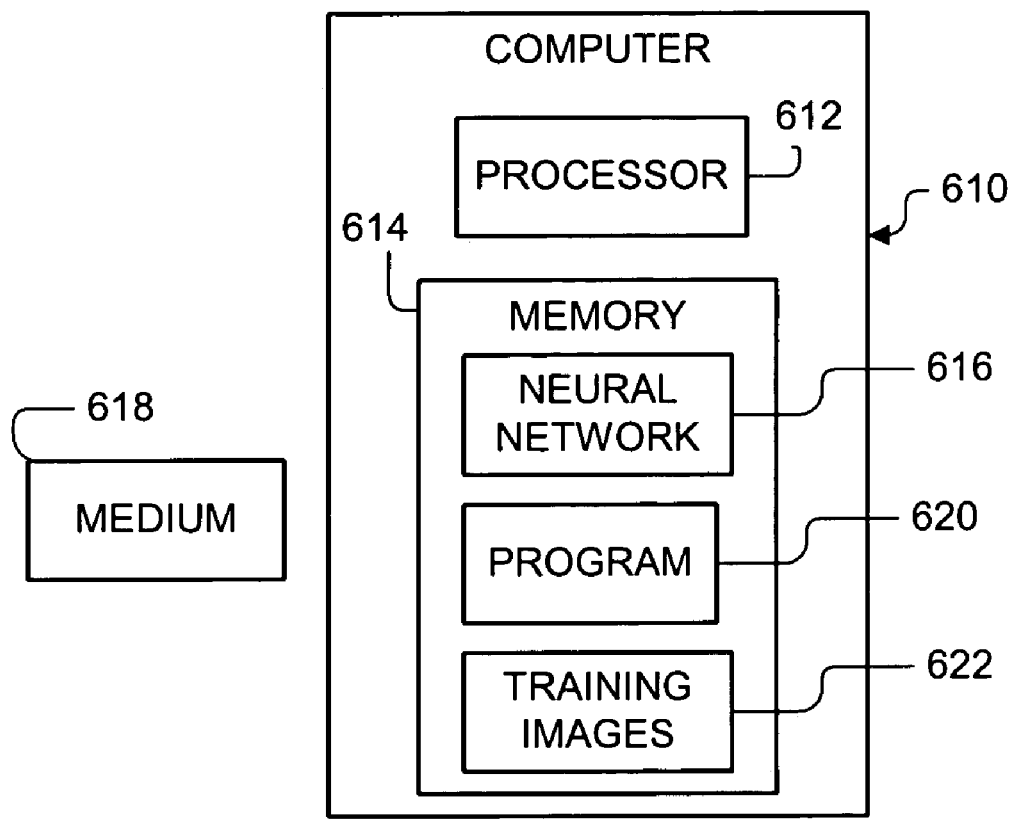
FIG. 6 is an illustration of an apparatus in accordance with an embodiment of the present invention.

Referring to FIG. 6, a computer 610 includes a processor 612 and computer memory 614. The memory 614 stores the details of the trained neural network 616, including information about the weights of the input, hidden and output nodes.

The neural network 616 may be trained and used in the same computer 610, or it may be trained on one computer and used on one or more other computers. The training computer may store a program 620 and training images 622 for training the neural network 616 in accordance with the method described above. The trained neural network 616 can then be transmitted other computers.

The neural network 616 can be distributed (e.g., sold commercially) in any number of ways. For example, the neural network can be distributed via a removable medium 618 such as an optical disc (e.g., DVD) or transmitted (e.g., as an installable package over the Internet) from memory of one machine to another. The neural network 616 could be loaded on a machine (e.g., a printer, a personal computer), which would be distributed.

The output image(s) can also be distributed in any number of ways. For example, the output images can be distributed via a removable medium 718 such as an optical disc (e.g., DVD) or transmitted (e.g., over the Internet) from memory of one machine to another.

The trained neural network is not limited to any particular application. An exemplary application is a printer pipeline. If an image to be printed is a strongly compressed JPEG image, then it would be desirable to reduce the artifacts before performing other image processing, such as denoising, sharpening, and contrast enhancement. A controller of the printer could be programmed with a neural network for performing the artifact reduction.

As mentioned above, the present invention is not limited to JPEG images. The neural network according to the present invention could be used with a variety of transform methods, such as JPEG2000 and PNG. It could even be applied on a per-frame basis to MPEG and other similar algorithms.

The present invention is not limited to the specific embodiments described above. Instead, the present invention is construed according to the claims the follow.

The invention claimed is:

1. A method comprising training a neural network to reduce artifacts in spatial domain representations of images that were compressed by a transform method and then decompressed, the training including:
   accessing a training set that includes first and second images, the second image being a version of the first image that was compressed by a transform method and then decompressed;
   using the neural network to generate an output image from the second image of the training set;
   determining differences between the output image and the first image, including generating error neighborhoods; and
   using the error neighborhoods to adjust connection weights of the neural network.

2. The method of claim 1, wherein the transform method included dividing the first image into pixel blocks; and wherein pixel locations within their transform blocks are also supplied to the neural network during the training.

3. The method of claim 1, wherein the error neighborhoods are used to generate derivatives of total error with respect to a neighborhood of errors; wherein gradients are computed from the derivatives; and wherein the gradients are used to adjust the connection weights.

4. The method of claim 3, further comprising punishing spatially correlated errors in the error neighborhoods.

5. The method of claim 1, wherein the error neighborhoods are used by a non-gradient descent algorithm to adjust the connection weights.

6. The method of claim 1, wherein the neural network processes more than one pixel at a time.

7. The method of claim 1, wherein input and output data of the neural network are coded to improve the neural network accuracy.

8. The method of claim 7, wherein relative coding is used.

9. The method of claim 7, wherein scaled coding is used.

10. Apparatus comprising a processor programmed with the trained neural network of claim 1.

11. An article comprising computer memory encoded with the trained neural network of claim 1.

12. Apparatus comprising computer memory encoded with a neural network; and means for training the neural network to reduce artifacts in spatial domain representations of images that were transformed from a spatial domain representation to a frequency domain and back to the spatial domain representation, the training means accessing a training set that includes first and second images, the second image being a version of the first image that was compressed by a transform method and then decompressed; using the neural network to generate an output image from the second image of the training set; determining error neighborhoods between the output image and the first image; and using the error neighborhoods to adjust connection weights of the neural network.

13. The apparatus of claim 12, further comprising performing one of relative and scaled coding on input and output data of the neural network to improve neural network accuracy.

14. The apparatus of claim 12, wherein the transform method included dividing the first image into pixel blocks; and wherein the training means also uses pixel offsets with respect to the transform blocks to generate the output image.

15. The apparatus of claim 12, wherein the error neighborhoods are used to generate derivatives of total error with respect to a neighborhood of errors; wherein gradients are computed from the derivatives; and wherein the gradients are used to adjust the connection weights.

16. The apparatus of claim 15, wherein the training means also punishes spatially correlated errors in the error neighborhoods.

17. The apparatus of claim 12, wherein the error neighborhoods are used by a non-gradient descent algorithm to adjust the connection weights.

18. The apparatus of claim 12, wherein the training means generates input vectors for the pixels in the first image, and processes the input vectors independently of one another to generate the output image, each input vector including a neighborhood of pixels.

19. An article for a processor, the article comprising computer memory encoded with a program for instructing the processor to train a neural network to reduce artifacts in images that were compressed in the frequency domain and then decompressed, the training including accessing first and second images, the second image being a version of the first image that was compressed by a transform method and then decompressed; using the neural network to generate an output image from the second image of the training set; determining error neighborhoods between the output image and the first image; and using the error neighborhoods to adjust connection weights of the neural network.

20. The article of claim 19, further comprising performing one of relative and scaled coding on input and output data of the neural network to improve neural network accuracy.

21. The article of claim 19, wherein the compression of the first image included dividing the first image into pixel blocks; and wherein pixel offsets with respect to the transform blocks are used by the neural network in addition to the first image.

22. The article of claim 19, wherein the error neighborhoods are used to generate derivatives of total error with respect to a neighborhood of errors; wherein gradients are computed from the derivatives; and wherein the gradients are used to adjust the connection weights.

23. The article of claim 22, wherein spatially correlated errors in the error neighborhoods are punished.

24. The article of claim 19, wherein the error neighborhoods are used by a non-gradient descent algorithm to adjust the connection weights.

25. The article of claim 19, wherein input vectors are generated for the pixels in the first image, and wherein the neural network processes the input vectors independently of one another to generate the output image, each input vector including a neighborhood of pixels.

* * * * *